United States Patent
Urban et al.

(10) Patent No.: US 9,890,711 B2
(45) Date of Patent: Feb. 13, 2018

(54) GAS TURBINE ENGINE WITH BLEED DUCT FOR MINIMUM REDUCTION OF BLEED FLOW AND MINIMUM REJECTION OF HAIL DURING HAIL INGESTION EVENTS

(71) Applicant: United Technologies Corporation, Hartford, CT (US)

(72) Inventors: Justin R. Urban, Tolland, CT (US); Anthony R. Bifulco, Ellington, CT (US)

(73) Assignee: United Technologies Corporation, Farmington, CT (US)

(*) Notice: Subject to any disclaimer, the term of this patent is extended or adjusted under 35 U.S.C. 154(b) by 2 days.

(21) Appl. No.: 14/452,880

(22) Filed: Aug. 6, 2014

(65) Prior Publication Data
US 2014/0345294 A1    Nov. 27, 2014

Related U.S. Application Data

(63) Continuation of application No. 12/886,807, filed on Sep. 21, 2010, now abandoned.

(51) Int. Cl.

| F01D 9/06 | (2006.01) |
|---|---|
| F02C 6/08 | (2006.01) |
| F02C 7/05 | (2006.01) |
| F02C 7/047 | (2006.01) |
| F01D 17/10 | (2006.01) |
| F02K 3/06 | (2006.01) |
| F02C 6/18 | (2006.01) |

(Continued)

(52) U.S. Cl.
CPC ............. *F02C 6/08* (2013.01); *F01D 17/105* (2013.01); *F02C 6/18* (2013.01); *F02C 7/047* (2013.01); *F02C 7/05* (2013.01); *F02C 7/052* (2013.01); *F02K 3/06* (2013.01); *F04D 29/545* (2013.01); *F04D 27/023* (2013.01); *F05D 2260/606* (2013.01); *F05D 2260/607* (2013.01); *Y02T 50/675* (2013.01); *Y10T 29/49231* (2015.01)

(58) Field of Classification Search
CPC .......... F01D 9/065; F01D 25/02; F02C 7/047; F02C 7/05; B64D 2033/0233
USPC .................. 60/39, 39.092, 39.093, 782, 785; 415/177, 178, 116
See application file for complete search history.

(56) References Cited

U.S. PATENT DOCUMENTS

| 2,575,415 A | 11/1951 | Grimac |
|---|---|---|
| 3,638,428 A | 2/1972 | Shipley et al. |

(Continued)

FOREIGN PATENT DOCUMENTS

| EP | 0103384 | 3/1984 |
|---|---|---|
| EP | 1403486 | 3/2004 |

(Continued)

OTHER PUBLICATIONS

European Search Report for Application No. 11181860.5 dated Apr. 30, 2015.

(Continued)

*Primary Examiner* — Sean J Younger
(74) *Attorney, Agent, or Firm* — Carlson, Gaskey & Olds, P.C.

(57) ABSTRACT

A gas turbine engine includes a bleed structure which includes a forward wall and a rear structural wall to define a deposit space downstream of the bleed structure for a hail event of a predetermined duration.

12 Claims, 6 Drawing Sheets

(51) Int. Cl.
  *F02C 7/052* (2006.01)
  *F04D 29/54* (2006.01)
  *F04D 27/02* (2006.01)

(56) References Cited

U.S. PATENT DOCUMENTS

| | | | |
|---|---|---|---|
| 3,964,257 | A | 6/1976 | Lardellier |
| 3,972,349 | A | 8/1976 | Tumavicus |
| 3,979,903 | A | 9/1976 | Hull, Jr. et al. |
| 4,069,662 | A | 1/1978 | Redinger, Jr. et al. |
| 4,070,827 | A | 1/1978 | Vanfleet et al. |
| 4,250,703 | A | 2/1981 | Norris et al. |
| 4,304,093 | A | 12/1981 | Schulze |
| 4,329,114 | A | 5/1982 | Johnston et al. |
| 4,346,860 | A | 8/1982 | Tedstone |
| 4,391,290 | A | 7/1983 | Williams |
| 4,463,552 | A | 8/1984 | Monhardt et al. |
| 4,493,184 | A | 1/1985 | Nikkanen et al. |
| 4,546,605 | A | 10/1985 | Mortimer et al. |
| 4,715,779 | A | 12/1987 | Suciu |
| 4,844,489 | A | 7/1989 | Acker, III et al. |
| 4,849,895 | A | 7/1989 | Kervistin |
| 4,881,367 | A | 11/1989 | Flatman |
| 5,044,153 | A | 9/1991 | Mouton |
| 5,048,288 | A | 9/1991 | Bessette et al. |
| 5,119,625 | A | 6/1992 | Glowacki |
| 5,123,240 | A | 6/1992 | Frost et al. |
| 5,261,228 | A | 11/1993 | Shuba |
| 5,279,109 | A | 1/1994 | Liu et al. |
| 5,351,473 | A | 10/1994 | Shuba |
| 6,092,987 | A * | 7/2000 | Honda ............... F01D 17/00 415/126 |
| 6,131,855 | A | 10/2000 | Porte et al. |
| 6,438,941 | B1 | 8/2002 | Elliot et al. |
| 6,802,691 | B2 * | 10/2004 | Chlus ............... F01D 17/141 415/145 |
| 6,881,032 | B2 * | 4/2005 | Malmborg ......... F01D 9/023 415/209.2 |
| 7,249,929 | B2 | 7/2007 | Cummings et al. |
| 7,647,761 | B2 | 1/2010 | Gauthier et al. |
| 2008/0063515 | A1 * | 3/2008 | Bil ................ F01D 17/105 415/145 |
| 2008/0193279 | A1 * | 8/2008 | Albert ............ F01D 17/105 415/145 |
| 2009/0092482 | A1 | 4/2009 | Winter |
| 2011/0036098 | A1 | 2/2011 | Baten |

FOREIGN PATENT DOCUMENTS

| | | |
|---|---|---|
| EP | 1531236 | 5/2005 |
| GB | 624402 | 6/1949 |
| GB | 785721 | 11/1957 |
| GB | 870182 | 6/1961 |
| GB | 1122684 | 8/1968 |
| GB | 1258299 | 12/1971 |
| GB | 1389347 | 4/1975 |
| GB | 1417154 | 12/1975 |
| GB | 2047815 | 12/1980 |
| GB | 2074655 | 11/1981 |
| GB | 2216855 | 10/1989 |

OTHER PUBLICATIONS

European Search Report for Application No. 11181860.5 dated Jul. 28, 2015.

* cited by examiner

GAS TURBINE ENGINE WITH BLEED DUCT FOR MINIMUM REDUCTION OF BLEED FLOW AND MINIMUM REJECTION OF HAIL DURING HAIL INGESTION EVENTS

CROSS REFERENCE TO RELATED APPLICATION

This application is a continuation of U.S. patent application Ser. No. 12/886,807 which was filed on Sep. 21, 2010.

BACKGROUND

The present disclosure relates to gas turbine engines; particularly bleed flow handling for gas turbine engines.

In aircraft gas turbine engines, air is directed through multiple stage compressors. As the air passes through each successive compressor stage, the pressure of the air is increased. Under certain conditions, such as when the engine is operating at off design conditions, interstage bleed through various bleed ducts is utilized to rematch the compressor stages. Typically, a station 2.5 bleed duct is also utilized to remove hail ice, ice crystals, and accreted ice in flight.

A gas turbine engine according to an exemplary aspect of the present disclosure includes a bleed structure with a forward wall and a rear structural wall to define a deposit space downstream of the bleed structure for a hail event of a predetermined duration.

A gas turbine engine according to an exemplary aspect of the present disclosure includes a bleed structure with a forward wall and an aft wall and a fluid plenum at least partially formed by the aft wall to receive a heated fluid.

A method to minimize the formation of hail in a bleed passage of a gas turbine engine according to an exemplary aspect of the present disclosure includes defining a deposit space downstream of a bleed structure for a hail event of a predetermined duration.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
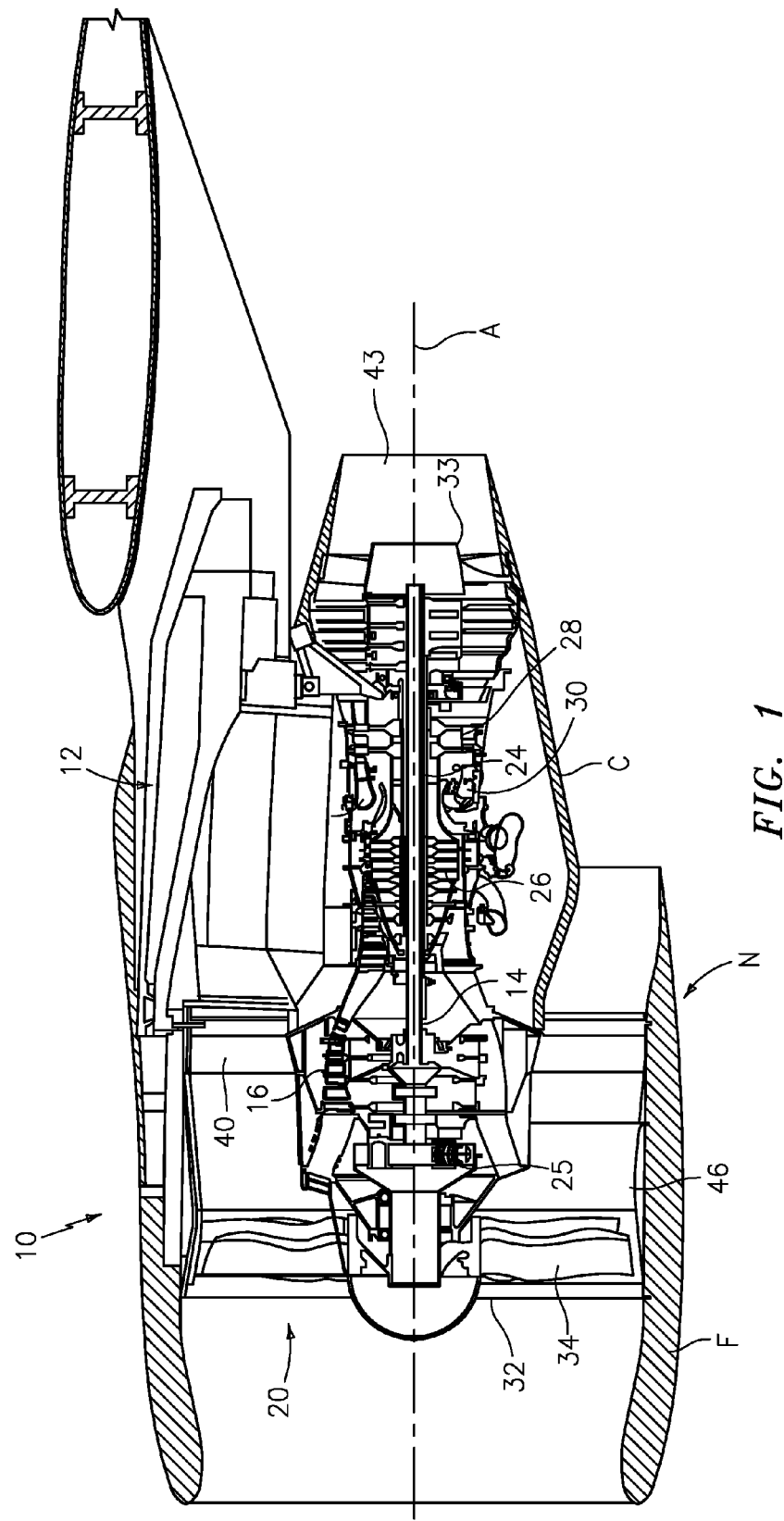
FIG. 1 is a general sectional view through a gas turbine engine along the engine longitudinal axis.

FIG. 1 illustrates a general partial fragmentary schematic view of a gas turbofan engine 10 suspended from an engine pylon 12 within an engine nacelle assembly N as is typical of an aircraft designed for subsonic operation. While a two spool high bypass turbofan engine with a geared architecture is schematically illustrated in the disclosed non-limiting embodiment, it should be understood that the disclosure is applicable to other gas turbine engine configurations.

The turbofan engine 10 includes a core engine within a core nacelle C that houses a low spool 14 and high spool 24. The low spool 14 includes a low pressure compressor 16 and low pressure turbine 18. The low spool 14 drives a fan section 20 connected to the low spool 14 either directly or through a geared architecture 25. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

Airflow enters the fan nacelle F which at least partially surrounds the core nacelle C. The fan section 20 communicates airflow into the core nacelle C to the low pressure compressor 16 and the high pressure compressor 26. Core airflow compressed by the low pressure compressor 16 and the high pressure compressor 26 is mixed with the fuel in the combustor 30, is ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. The low pressure turbine 18 also drives the fan section 20 to communicate a bypass flow. A core engine exhaust exits the core nacelle C through a core nozzle 43 defined between the core nacelle C and a tail cone 33.

Figure 2:
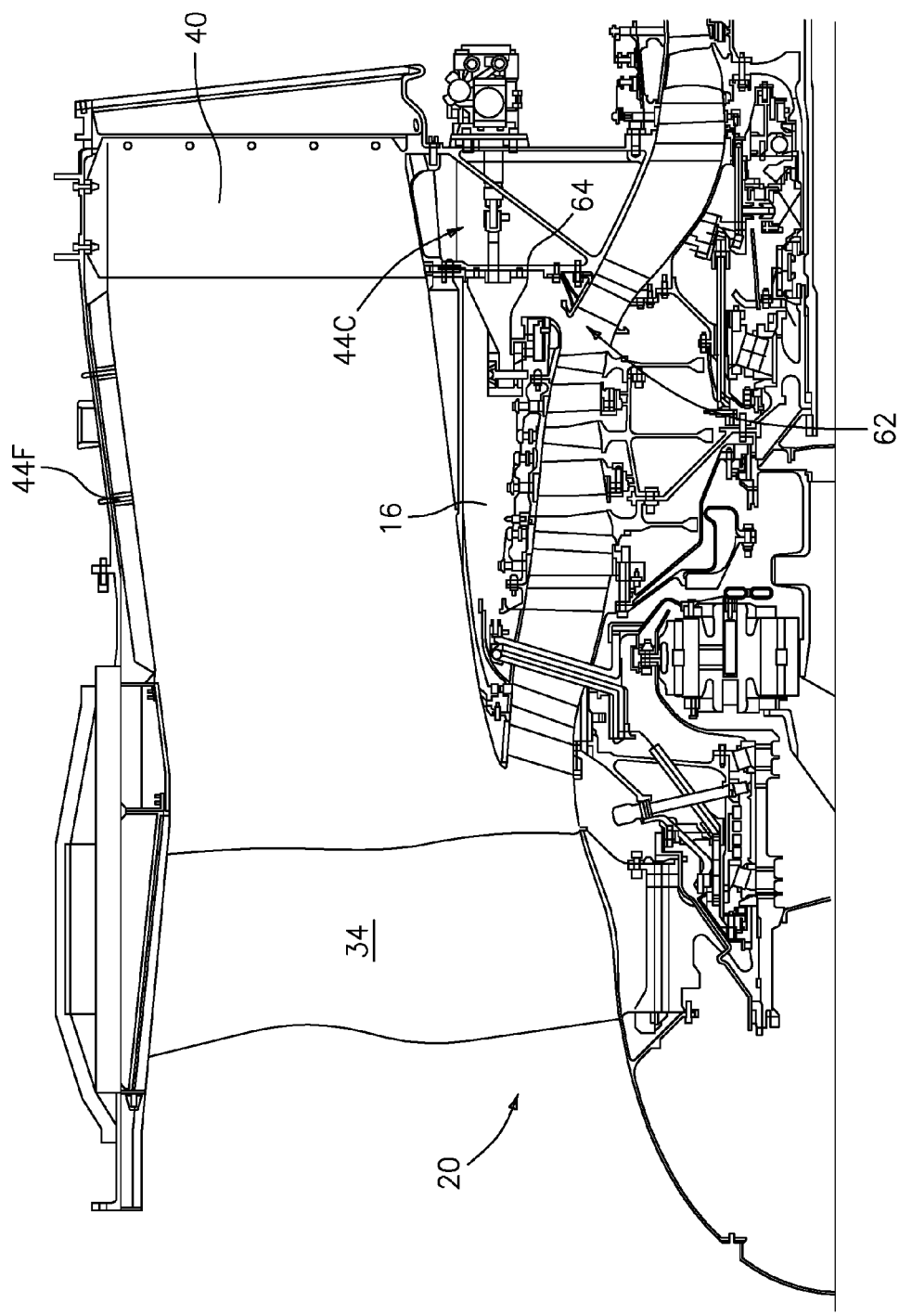
FIG. 2 is an expanded side sectional view through a gas turbine engine illustrating a 2.5 bleed structure.

With reference to FIG. 2, engine static structure 44 generally has sub-structures which may include a case structure often referred to as the engine backbone. The fan section 20 includes a fan rotor 32 with a plurality of circumferentially spaced radially outwardly extending fan blades 34. The fan blades 34 are surrounded by a fan case structure 44F. The core case structure 44C is secured to the fan case structure 44F through a multiple of circumferentially spaced radially extending fan exit guide vanes (FEGVs) 40 which radially span a core case structure 44C and the fan case structure 44F defined about the engine axis A.

A bleed structure 62 such as a 2.5 bleed duct structure is typically located just forward of a rear structural wall 64 of the core case structure 44C to direct core airflow compressed by the low pressure compressor 16 selectively out into the bypass flow stream through a bleed valve (not shown). It should be understood that the bleed structure 62 may be of various bleed duct and bleed door configurations as generally understood. The rear structural wall 64 is located inboard of the FEGVs 40 to at least partially provide support therefore. It should be understood that the shape and configuration of the engine static structure 44 and rear structural wall 64 may be of various forms.

Figure 3:
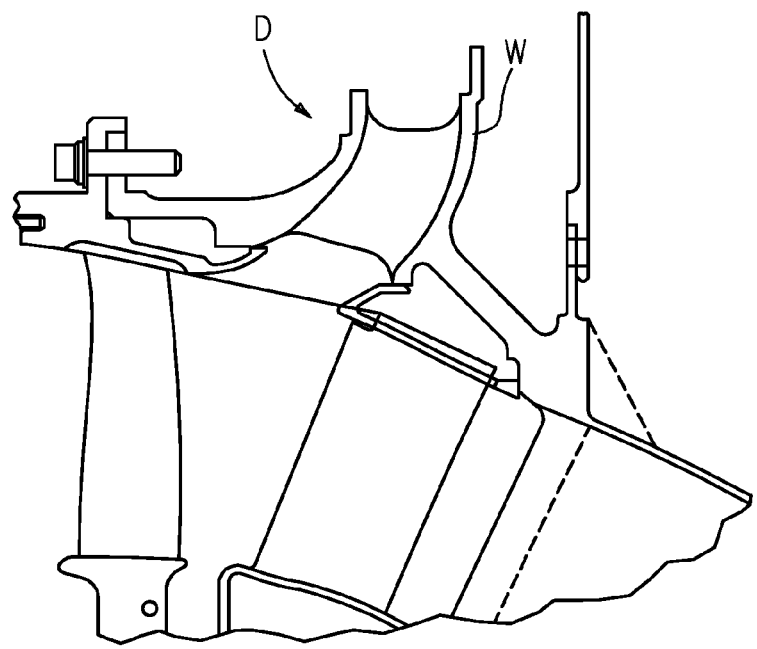
FIG. 3 is an expanded sectional view of a RELATED ART 2.5 bleed structure.

Applicant has determined that hail event blockage within the Station 2.5 bleed system usually takes place upon a bleed duct aft wall W of a bleed duct structure D (RELATED ART; FIG. 3). Thus, modification of the bleed duct aft wall W such that the flow area will not be reduced when hail ice enters the station 2.5 bleed system will solve the issue of bleed flow reduction and hail extraction efficiency reduction during hail events.

Figure 4:
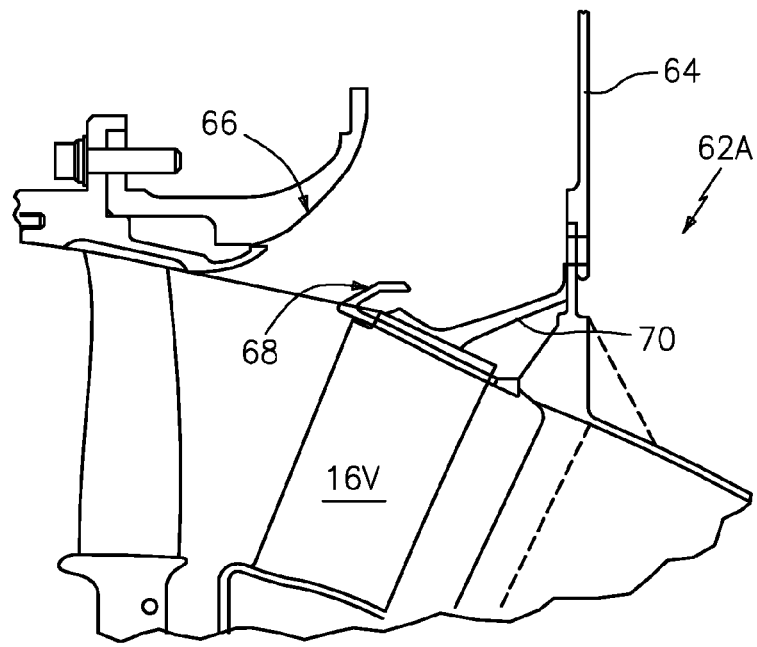
FIG. 4 is an expanded sectional view of a 2.5 bleed structure in accords with one embodiment of the present disclosure.

With Reference to FIG. 4, a bleed structure 62A according to one disclosed non-limiting embodiment essentially deletes the bleed duct aft wall W but maintains a forward wall 66 and a bleed duct aft lip 68. The forward wall 66 and the bleed duct aft lip 68 thereby defines the flow path for the 2.5 bleed structure 62A. The forward wall 66 maintains the aerodynamic properties of the bleed duct structure via a forward wall coanda effect. The hail ice buildup base may also be minimized through optimization of the length of the bleed duct aft lip 68 so as to increases shedding frequency therefrom to direct the ice toward the rear structural wall 64 which backstops the bleed structure 62A and provides the necessary deposit space for a hail event of a predetermined duration such as 30 seconds. That is, the bleed structure 62 is defined by the forward wall 66, the lip 68 and the rear structural wall 64 of the core case structure 44C rather than a specifically defined duct (RELATED ART; FIG. 3). Ribs 70 or other static structure may alternatively or additionally be utilized to provide the desired structural support within the core case structure 44C for the low pressure compressor vanes 16V which may have been hereto for provided by the rear wall.

Figure 5:
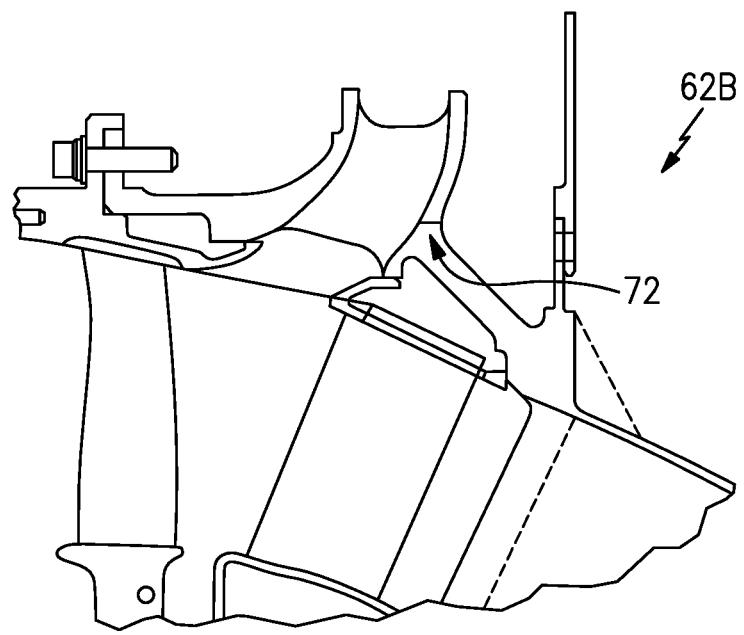
FIG. 5 is an expanded sectional view of a 2.5 bleed structure in accords with another embodiment of the present disclosure.
Figure 6:
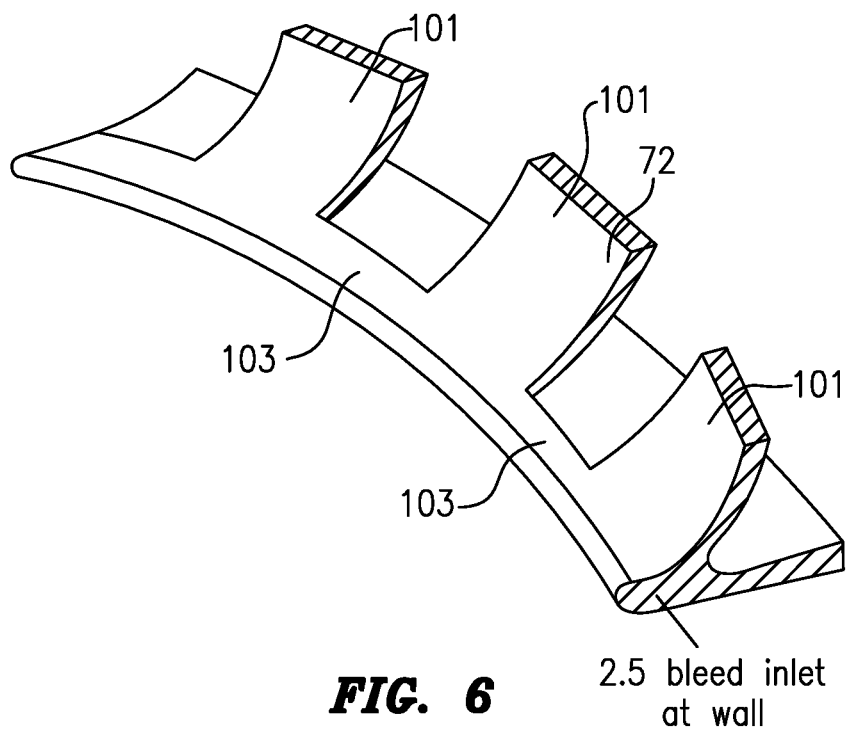
FIG. 6 is a perspective partial sectional view of a circumferentially intermittent aft wall of the 2.5 bleed structure of FIG. 5.

With reference to FIG. 5, a bleed structure 62B according to another disclosed non-limiting embodiment, provides a circumferentially intermittent bleed duct aft wall 72. That is, the bleed duct aft wall 72 includes circumferential openings to provide a tooth like structure which is also backstopped by the rear structural wall 64 (FIG. 6). The openings in the aft wall 72 are defined by first intermittent aft wall regions 101 having a first radial length and second intermittent aft wall regions 103 having a second radial length. Each of said first regions 101 is adjacent two of the second regions 103 and each of the second regions 103 is adjacent two of the first regions 101.

Figure 7:
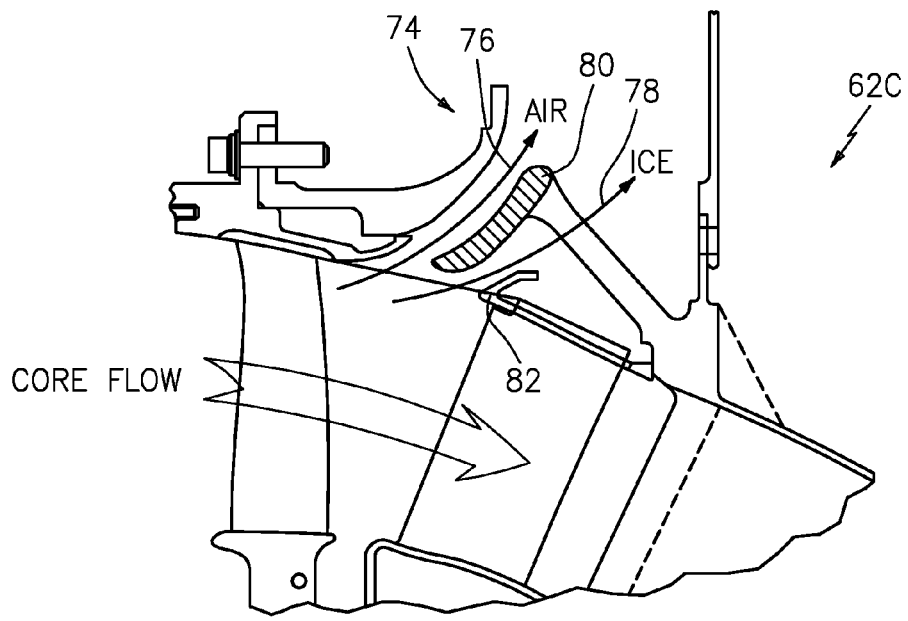
FIG. 7 is an expanded sectional view of a 2.5 bleed structure in accords with another embodiment of the present disclosure.

With reference to FIG. 7, a bleed structure 62C according to another disclosed non-limiting embodiment, includes a split duct particle separation structure 74 which defines a bleed airflow path 76 and a particle path 78 aft of the bleed airflow path 76. A split wall 80 separates the bleed airflow path 76 and the particle path 78. The split wall 80 and a particle separation wall 82 are radially arranged relative the core flow path to separate the hail from the airflow in a manner such as an inlet particle separator. That is, the split wall 80 may be radially inboard of the particle separation wall 82 such that hail is directed through the particle path 78.

Figure 8:
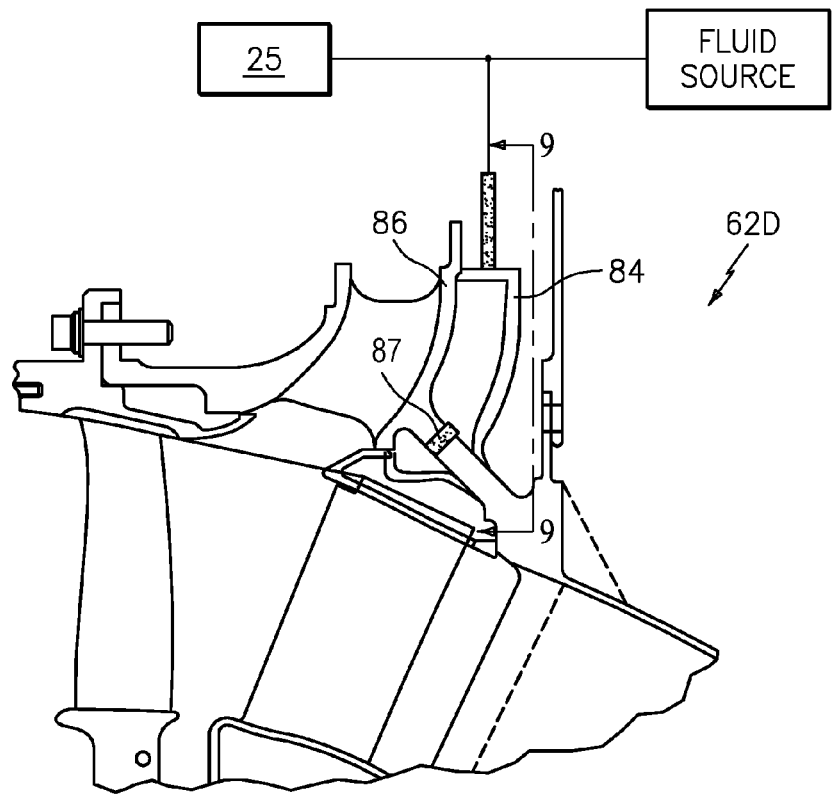
FIG. 8 is an expanded sectional view of a 2.5 bleed structure in accords with another embodiment of the present disclosure.
Figure 9:
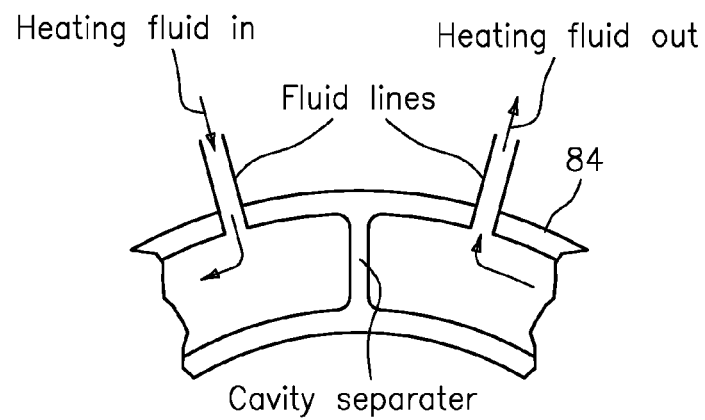
FIG. 9 is a partial sectional view of a plenum of the 2.5 bleed structure of FIG. 8.

With reference to FIG. 8, a bleed structure 62D according to another disclosed non-limiting embodiment, provides a plenum 84 at least partially formed by a bleed duct aft wall 86. The plenum 84 circulates a fluid such as warmer bleed air or oil as a heating fluid to inhibit the accumulation or formation of hail/ice in the 2.5 bleed passage. As the geared architecture 25 (FIG. 1) receives warm air and oil which is communicated forward of the LPC, either or both of these fluids is diverted into the plenum 84. It should be understood that other non-geared architecture designs may obtain the fluid from other sources. Passage may be provided through structural walls via local pass through conduits 86. In the disclosed non-limiting embodiment, the fluid enters at one or more locations and is pumped into and around the plenum 84 (FIG. 9) then communicated to a destination such as the geared architecture 25.

Figure 10:
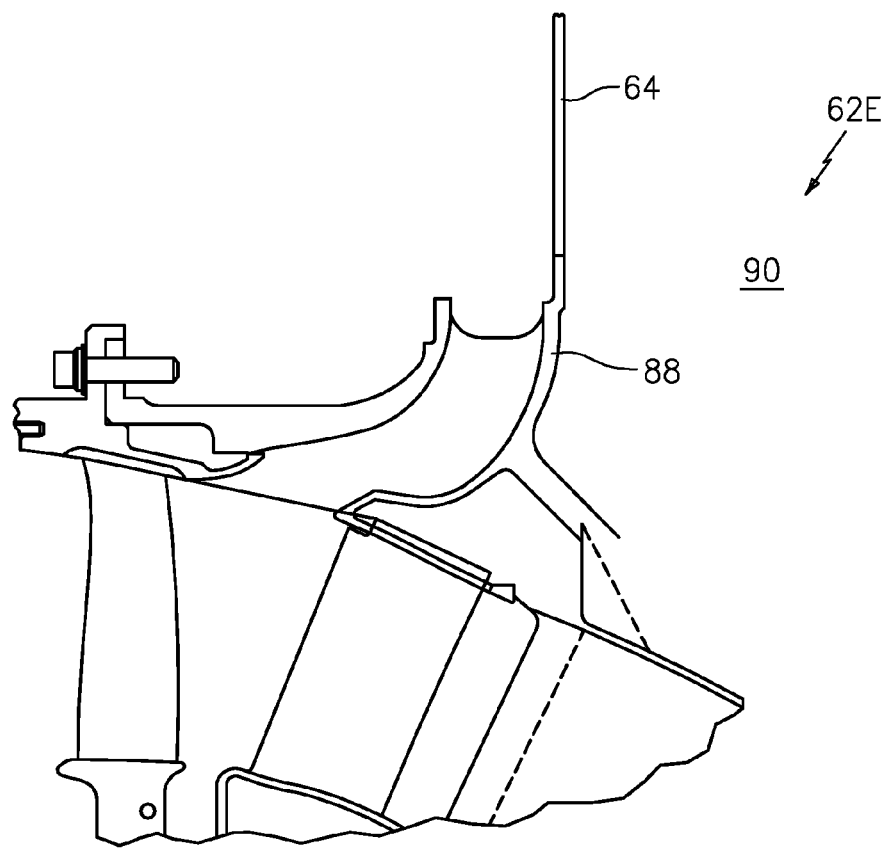
FIG. 10 is an expanded sectional view of a 2.5 bleed structure in accords with another embodiment of the present disclosure.

With reference to FIG. 10, a bleed structure 62E according to another disclosed non-limiting embodiment locates the rear structural wall 64' of the core case structure 44C which at least partially forms the bleed duct bleed duct aft wall 88. The rear structural wall 64' is directly adjacent to, for example, high pressure compressor case module 90 which generally operates at a higher temperature and/or has greater mass and thereby heats the bleed duct bleed duct aft wall 88 to inhibit the accumulation or formation of hail/ice in the 2.5 bleed passage.

If no significant degree of ice clogging were to take place due to specific design features, then a rig test is not required to determine the level of clogging. The bleed duct structures disclosed herein may enable elimination of hail ingestion certification rigs and allow turbofan engines to digest more hail than current designs. The bleed duct structures disclosed herein will also provide an increased margin during hail ingestion events and may decrease overall weight. Furthermore, regulations may change over time to require increased hail ingestion and the bleed duct structures disclosed herein will readily accommodate such an increase.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed:

1. An assembly for a gas turbine engine comprising:
    a bleed structure including a forward wall;
    a rear structural wall aft of said bleed structure;
    a plenum defined at least partially by said rear structural wall;
    a circumferentially intermittent aft wall including a plurality of slots defining openings into said plenum, wherein the plenum is further defined at least partially by the circumferentially intermittent aft wall; and
    each of the plurality of slots is defined by a first intermittent aft wall region having a first radial length, the first radial length extending from a radially innermost edge of the circumferentially intermittent aft wall to an outer edge of the circumferentially intermittent aft wall at a circumferential position of the first intermittent aft wall region, and a second intermittent aft wall region having a second radial length, the second radial length extending from the radially innermost edge of the circumferentially intermittent aft wall to an outer edge of the intermittent aft wall at a circumferential position of the second intermittent aft wall region, the first radial length being different from the second radial length, and wherein each of said first regions is adjacent two of said second regions and each of said second regions is adjacent two of said first regions.

2. The assembly for a gas turbine engine of claim 1, wherein the circumferentially intermittent aft wall extends radially outward from a bleed duct aft lip.

3. The assembly for a gas turbine engine of claim 1, wherein the circumferentially intermittent aft wall includes a circumferentially contiguous portion.

4. The assembly for a gas turbine engine as recited in claim 1, wherein said rear structural wall forms a portion of a core case section.

5. The assembly for a gas turbine engine as recited in claim 1, wherein said rear structural wall backstops the bleed structure.

6. The assembly for a gas turbine engine as recited in claim 1, further comprising a split duct particle separation structure aft of said forward wall which defines a bleed airflow path and a particle path aft of said bleed airflow path.

7. The assembly for a gas turbine engine as recited in claim 6, wherein said split duct particle separation structure includes a split wall and a particle separation wall.

8. The assembly for a gas turbine engine as recited in claim 7, wherein said split wall is radially outboard of said particle separation wall.

9. The assembly for a gas turbine engine as recited in claim 1, wherein said rear structural wall at least partially forms the bleed duct aft wall.

10. The assembly for a gas turbine engine as recited in claim 9, wherein said rear structural wall separates a first engine section from a second engine section.

11. The assembly for a gas turbine engine as recited in claim 9, wherein said rear structural wall is directly adjacent to a high pressure compressor case.

12. The assembly for a gas turbine engine as recited in claim 1, wherein said plenum is sized for a hail event of a predetermined duration.

* * * * *